(12) United States Patent
Cho et al.

(10) Patent No.: US 9,014,495 B2
(45) Date of Patent: Apr. 21, 2015

(54) PARALLEL INTRA PREDICTION METHOD FOR VIDEO DATA

(71) Applicant: Electronics and Telecommunications Research Institute, Daejeon (KR)

(72) Inventors: Seunghyun Cho, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 134 days.

(21) Appl. No.: 13/848,096

(22) Filed: Mar. 21, 2013

(65) Prior Publication Data

US 2013/0266234 A1    Oct. 10, 2013

(30) Foreign Application Priority Data

Apr. 10, 2012  (KR) .................. 10-2012-0037583

(51) Int. Cl.
*G06K 9/36* (2006.01)
*G06T 9/00* (2006.01)

(52) U.S. Cl.
CPC ...................................... *G06T 9/004* (2013.01)

(58) Field of Classification Search
USPC ............. 382/236, 232, 238, 233; 375/240.12, 375/240.15, 240.23, 240.24, 240.25, 240.26
See application file for complete search history.

(56) References Cited

U.S. PATENT DOCUMENTS

| 8,472,083 | B2 * | 6/2013 | Arakawa et al. | 358/3.26 |
| 8,675,979 | B2 * | 3/2014 | Chiba et al. | 382/239 |
| 8,818,114 | B2 * | 8/2014 | Kim et al. | 382/232 |
| 2013/0089266 | A1 * | 4/2013 | Yang et al. | 382/238 |
| 2013/0182967 | A1 * | 7/2013 | Sato | 382/238 |

FOREIGN PATENT DOCUMENTS

KR    10-2001-0045132 A    6/2001
KR    10-2007-0088608 A    8/2007

OTHER PUBLICATIONS

Thomas Wiegand et al., "Overview of the H.264/AVC Video Coding Standard", IEEE Transactions on Circuits and Systems for Video Technology, Jul. 2003, pp. 560-576, vol. 13, No. 7.

* cited by examiner

*Primary Examiner* — Yon Couso
(74) *Attorney, Agent, or Firm* — Rabin & Berdo, P.C.

(57) ABSTRACT

Disclosed is a parallel intra prediction method for video data, including: dividing, by an intra prediction unit, pixels included in at least one prediction unit configuring a coding unit or a sub-coding unit so as to belong to any one of a reference pixel group and a prediction group; generating, by the intra prediction unit, reference sub blocks and prediction sub blocks, respectively, using reference pixels belonging to the reference pixel group and prediction pixels belonging to the prediction pixel group; performing, by the intra prediction unit, encoding processing on the reference sub blocks; and performing, by the intra prediction unit, encoding processing on the prediction sub blocks.

6 Claims, 6 Drawing Sheets

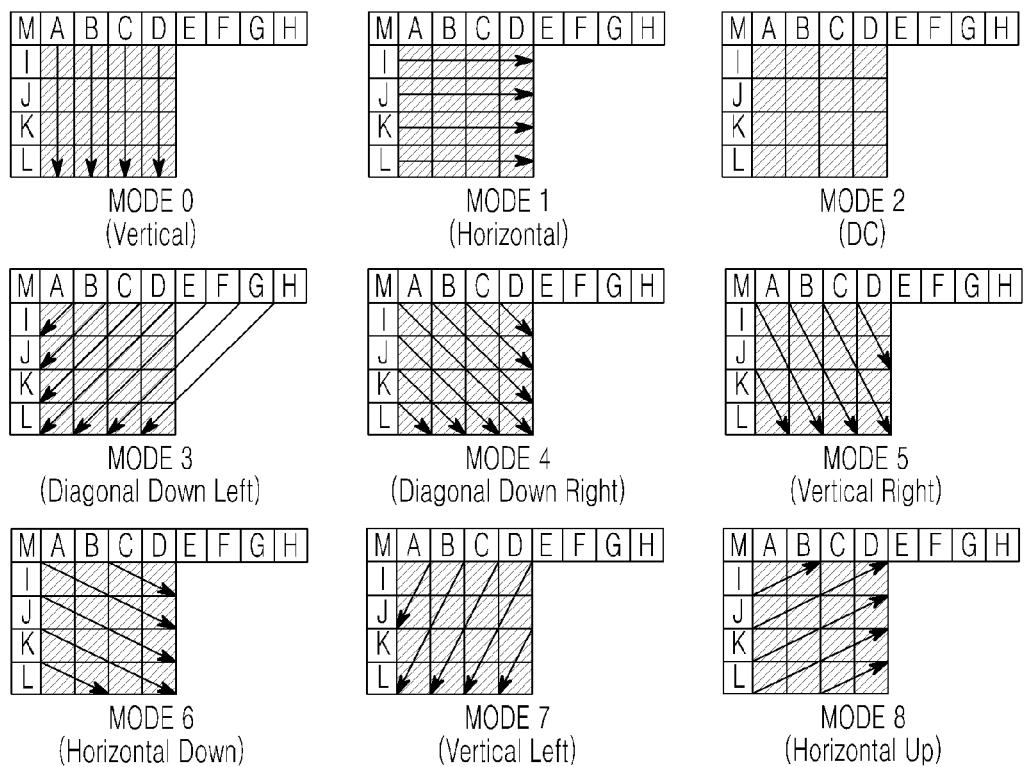

PARALLEL INTRA PREDICTION METHOD FOR VIDEO DATA

CROSS-REFERENCES TO RELATED APPLICATIONS

The present application claims priority under 35 U.S.C. 119(a) to Korean Application No. 10-2012-0037583, filed on Apr. 10, 2012, in the Korean Intellectual Property Office, which is incorporated herein by reference in its entirety set forth in full.

BACKGROUND

Exemplary embodiments of the present invention relate to a parallel intra prediction method for video data, and more particularly, to a parallel intra prediction method for video data capable of separating reference pixels into pixels predicted from the reference pixels during an encoding and decoding process for video data to perform intra prediction in parallel.

A demand for high-definition moving picture services has been increased with the development of various multimedia devices and the generalization of digital multimedia broadcasting services and the overall traffic of a network has been increased with the expansion of high-definition moving picture services. For this reason, attempts to develop a video codec for effectively encoding or decoding high-resolution video contents have been variously conducted.

Generally, in order to effectively compress video data, the encoding for video data is performed by a series of processes of dividing an original image into a plurality of blocks, predicting video data at locations of each block, and transforming and quantizing a difference value between original data and predicted data, and the like.

As described above, as a method for generating prediction image during an encoding process for video data, intra prediction and inter prediction have been proposed.

The intra prediction, which is a method for generating prediction signals from signals around a block to be encoded, removes spatial redundancy for video data present within a single frame to realize data compression.

On the other hand, the inter prediction indicates locations of the prediction signals by a motion vector based on motion estimation in a reference image to remove temporal redundancy for video data present between different frames.

FIG. 1 is a diagram illustrating an intra prediction mode and a prediction direction for a H.264/AVC 4×4 block.

Describing the intra prediction of the H.264/AVC encoder in accordance with the related art, the intra prediction may be performed in a 4×4, 8×8, and 16×16 pixel block unit and the 4×4 and 8×8 blocks use nine prediction modes and the 16×16 block uses four prediction modes.

Referring to FIG. 2 in which the intra prediction mode and the prediction direction of the 4×4 block are illustrated, the 4×4 pixel block shaded in each prediction mode is an encoding target block and the prediction signals of each pixel within the encoding target block are generated from the reference pixels represented by A, B, . . . , M neighbor thereto.

As an example of generating the prediction signals, in case of a vertical prediction mode represented by mode 0 of FIG. 1, A, B, C, and D pixels each are copied to pixels within the encoding target block on an arrow.

FIG. 2 is a diagram illustrating a prediction signal generation order for performing intra prediction encoding.

Generally, the intra prediction generates the prediction signals from the pixels around the encoding target block, such that inter-block data dependency is present during the encoding and decoding process.

For example, when a macro block 310 illustrated in FIG. 2 is subjected to the intra prediction encoding at a size of 4×4 block 320 based on a H.264/AVC compression standard, sixteen 4×4 blocks represented by No. 1, 2, . . . , 16 are present.

Here, in case of Nos. 2 and 3 blocks, the prediction signals for all the prediction modes can be generated after a prediction signal of No. 1 block is generated and in the case of No. 4 block, the prediction signals for all the prediction modes can be generated after the prediction signals of Nos. 2 and 3 blocks are generated. That is, it is difficult to rapidly perform the intra prediction due to the inter-block data dependency.

As the related art, there is KR Patent Laid-Open No. 2001-0045132 (Jun. 5, 2001, Title of the Invention: Intra Frame Encoding Method).

The above-mentioned technical configuration is a background art for helping understanding of the present invention and does not mean related arts well known in a technical field to which the present invention pertains.

SUMMARY

An embodiment of the present invention is directed to a parallel intra prediction method for video data capable of shortening encoding time by removing inter-prediction block data dependency to rapidly perform intra prediction when the intra prediction is performed during an encoding and decoding process for video data.

An embodiment of the present invention relates to a parallel intra prediction method for vide data, including: dividing, by an intra prediction unit, pixels included in at least one prediction unit to belong to any one of a reference pixel group and a prediction pixel group, the at least one prediction unit included in a coding unit or a sub-coding unit; generating, by the intra prediction unit, reference sub blocks and prediction sub blocks, respectively, using reference pixels belonging to the reference pixel group and prediction pixels belonging to the prediction pixel group; performing, by the intra prediction unit, encoding processing on the reference sub blocks; and performing, by the intra prediction unit, encoding processing on the prediction sub blocks.

In the dividing of the pixels included in the prediction unit so as to belong to any one of the reference pixel group and the prediction pixel group, the intra prediction unit may divide only pixels located at a left boundary surface and pixels located at the upper boundary surface among the pixels included in the prediction unit so as to belong to the reference pixel group.

In the generating of the reference sub blocks and the prediction sub blocks, respectively, the intra prediction unit may use location information of the reference pixels and the prediction pixels to generate the reference sub blocks and the prediction sub blocks.

In the performing of the encoding processing on the reference sub blocks, the intra prediction unit may use encoding processing results for the reference sub blocks previously encoded to perform encoding processing on subsequent reference sub blocks.

In the performing of the encoding processing on the prediction sub blocks, the intra prediction unit may use encoding processing results for the reference sub blocks to perform encoding processing on the prediction sub blocks.

The transform and quantization, inverse transform and dequantization processing for the reference pixel group and the prediction pixel group may be performed based on any one of the sub block unit, the prediction block unit, a Sub-CU unit, and a CU unit.

BRIEF DESCRIPTION OF THE DRAWINGS

The above and other aspects, features and other advantages will be more clearly understood from the following detailed description taken in conjunction with the accompanying drawings, in which:

FIG. 1 is a diagram illustrating an intra prediction mode and a prediction direction for a H.264/AVC 4×4 block;

FIG. 2 is a diagram illustrating a prediction signal generation order for performing intra prediction encoding;

DESCRIPTION OF SPECIFIC EMBODIMENTS

Figure 3:
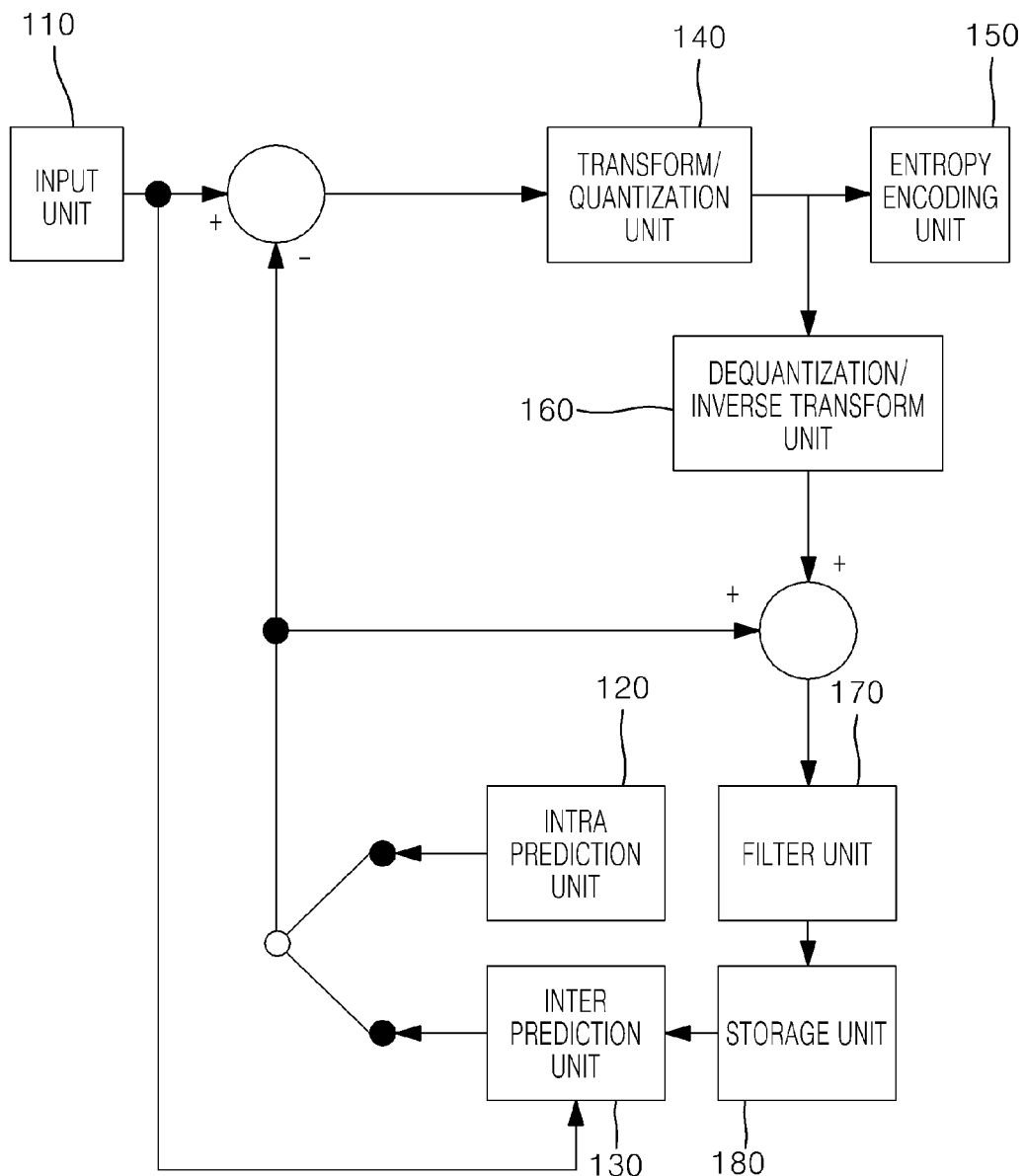
FIG. 3 is a block diagram schematically illustrating a video data encoder for performing a parallel intra prediction method for video data in accordance with an embodiment of the present invention.

Hereinafter, a parallel intra prediction method for video data in accordance with an embodiment of the present invention will be described in detail with reference to the accompanying drawings. During the process, a thickness of lines, a size of components, or the like, illustrated in the drawings may be exaggeratedly illustrated for clearness and convenience of explanation. Further, the following terminologies are defined in consideration of the functions in the present invention and may be construed in different ways by intention or practice of users and operators. Therefore, the definitions of terms used in the present description should be construed based on the contents throughout the specification.

Prior to detailed description of the present invention, for convenience of explanation and understanding, a coding unit (CU), a sub-coding unit (Sub-CU), and a prediction unit (PU) that are terms used in the present specification are defined as follows.

First, generally dividing and processing a screen in a pixel block unit having a predetermined size for encoding and decoding video data is defined by the coding unit (CU).

In addition, one or more coding unit may be present in the coding unit (CU), which is defined by a sub-coding unit (Sub-CU).

Further, for intra prediction or inter prediction, the inside of the coding unit (CU) or the sub-coding unit (Sub-CU) may be divided and processed in one or more pixel block unit, which is defined by the prediction unit (PU).

Hereinafter, a parallel intra prediction method for video data in accordance with an embodiment of the present invention will be described in detail based on the defined terms.

FIG. 3 is a block diagram schematically illustrating a video data encoder for performing the parallel intra prediction method for video data in accordance with an embodiment of the present invention.

As illustrated in FIG. 3, the video data encoder includes an input unit 110, an intra prediction unit 120, an inter prediction unit 130, a transform/quantization unit 140, an entropy encoding unit 150, a dequantization/inverse transform unit 140, a filter unit 170, and a storage unit 180.

An image input through the input unit 110 is divided into several blocks and is sequentially input and thus, is generated as a prediction image through the intra prediction unit 120 or the inter prediction unit 130.

In this configuration, the intra prediction unit 120 divides pixels in the prediction unit (PU) included in the coding unit (CU) or the sub-coding unit (Sub-CU) of the input image into a reference pixel group and a prediction pixel group and generates reference sub blocks and prediction sub blocks using location information of reference pixels and prediction pixels.

Hereinafter, the intra prediction unit 120 may perform processing on each reference sub block and then, processing on each prediction sub block, thereby performing parallel intra prediction.

As described above, the intra prediction unit 120 divides the pixels in the coding unit (CU) or the sub-coding unit (Sub-Cu) into the reference pixel group and the prediction pixel group and the detailed process of performing individual intra prediction on the reference pixels and the prediction pixels will be described below with reference to FIGS. 4 to 6.

Meanwhile, a residual image obtained by subtracting the prediction image from the input image is transmitted to the entropy encoding unit 150 via the transform/quantization unit 140 and is encoded together with prediction information, header information, and the like.

The signal via the transform/quantization unit 140 is reconstructed to the residual image through the dequantization unit/inverse transform unit 160, the prediction image is combined with the reconstructed residual image, and the reference image generated via the filter unit 170 is stored in the storage unit 180.

The reference image stored in the storage unit 180 is provided to the inter prediction unit 130 so as to be used for inter prediction later.

Figure 4:
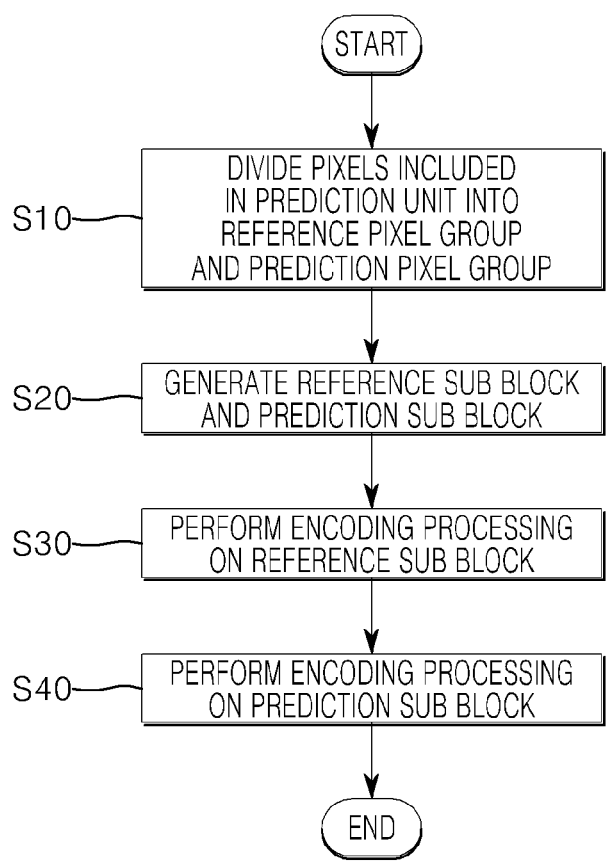
FIG. 4 is a flow chart illustrating an operation of a parallel intra prediction method for video data in accordance with an embodiment of the present invention.
Figure 5:
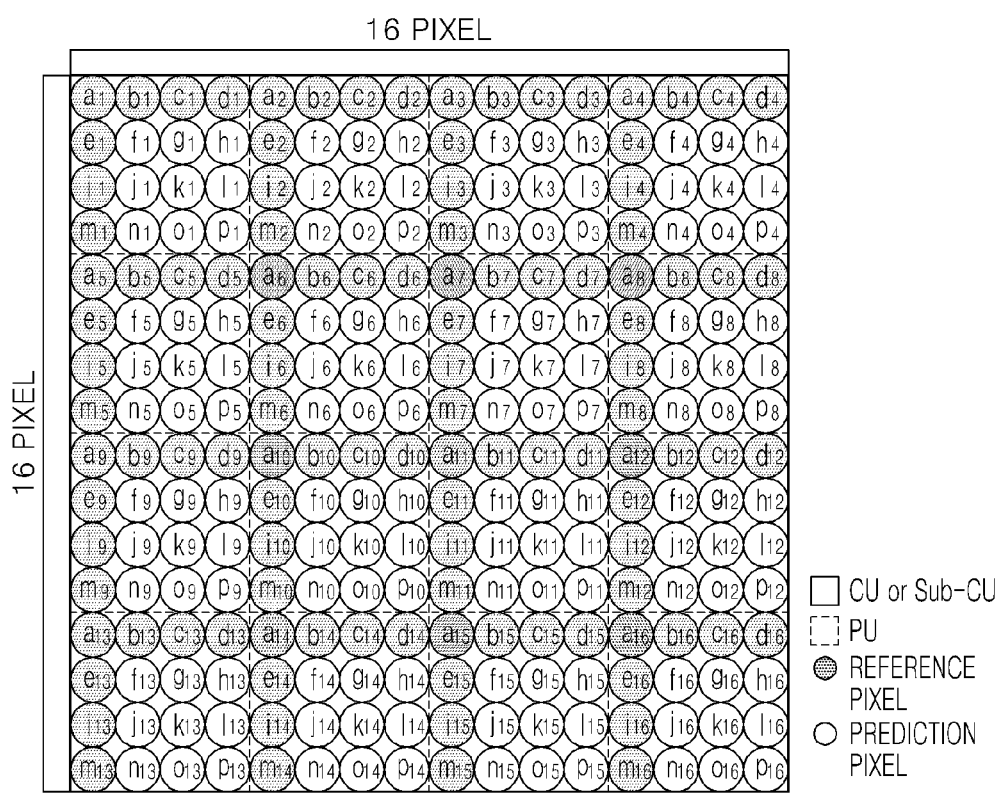
FIG. 5 is a first exemplified diagram of dividing a coding unit into a reference pixel group and a prediction pixel group in the parallel intra prediction method for video data in accordance with the embodiment of the present invention.
Figure 6:
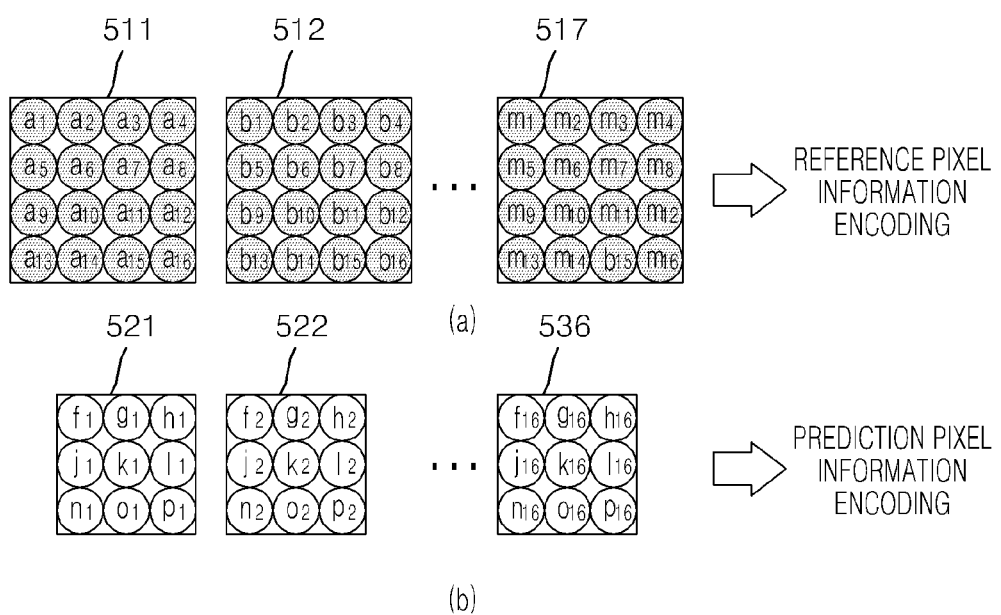
FIGS. 6A and 6B are exemplified diagrams illustrating a method for individually processing reference pixels and prediction pixels in the parallel intra prediction method for video data in accordance with the embodiment of the present invention.

FIG. 4 is a flow chart illustrating an operation of a parallel intra prediction method for video data in accordance with an embodiment of the present invention, FIG. 5 is a first exemplified diagram of dividing a coding unit into a reference pixel group and a prediction pixel group in the parallel intra prediction method for video data in accordance with the embodiment of the present invention, and FIGS. 6A and 6B are exemplified diagrams illustrating a method for individually processing reference pixels and prediction pixels in the parallel intra prediction method for video data in accordance with the embodiment of the present invention.

First, the intra prediction unit 120 divides the pixels in the prediction unit (PU) configuring the coding unit (CU) or the sub-coding unit (Sub-CU) for video data so as to belong to any one of the reference pixel group and the prediction pixel group (S10).

In this case, a single sub-coding unit (Sub-Cu) necessarily includes at least one reference pixel group and at least prediction pixel group. In addition, the single prediction unit (PU) includes one or less reference pixel group and necessarily includes a single prediction pixel group.

For example, as illustrated in FIG. 5, four 8×8 pixel sub-coding units (Sub-CUs) may be present in a single 16×16 pixel coding unit (CU) and four 4×4 pixel prediction units (PUs) may be present in each sub-coding unit (Sub-CU).

The pixels included in each prediction unit (PU) may be divided into the reference pixel group and the prediction pixel group by the intra prediction unit 120. In this case, the intra prediction unit 120 may divide pixels located at the left boundary surface and pixels located at the upper boundary surface among the pixels included in the prediction unit (PU) so as to belong to the reference pixel group.

Alphabet a, b, p represents the locations of the pixels in each prediction unit (PU) and numbers are described so as to divide each prediction unit (PU). For example, pixels belong to the reference pixel group of the first prediction unit (PU) located at the leftmost upper of the coding unit (CU) are $a_1$, $b_1$, $c_1$, $d_1$, $e_1$, $i_1$, $m_1$ and pixels belonging to the prediction pixel group are $f_1$, $g_1$, $h_1$, $j_1$, $k_1$, $l_1$, $n_1$, $o_1$, $p_1$.

Next, the intra prediction unit 120 collects the reference pixels or the prediction pixels so as to perform the individual processing on the pixels divided into the reference pixel group or the prediction pixel group to generate the reference sub blocks or the prediction sub blocks (S20).

In this case, the intra prediction unit 120 uses the location information of the pixels of the reference pixel group or the prediction pixel group to generate the reference sub blocks or the prediction sub blocks.

Next, the intra prediction unit 120 performs the encoding processing on the reference sub blocks (S30) and then, performs the encoding processing on the prediction sub blocks (S40).

FIGS. 6A and 6B illustrate a method for sorting and processing the reference pixels and the prediction pixels, respectively, to encode the coding unit (CU) illustrated in FIG. 4.

As illustrated in FIGS. 6A and 6B, the intra prediction unit 120 may collect the reference pixels at the same locations based on each prediction unit (PU) within the coding unit (CU) to generate the plurality of reference sub blocks 511, 512, and 517, and the like and perform the encoding processing on each reference sub block.

In this case, the intra prediction unit 120 may predict the subsequent reference sub blocks from the reference sub blocks previously encoded and decoded using the correlation between respective reference sub blocks (for example, 511, 512, 517, and the like) for efficiently encoding the reference pixels.

Similarly, the intra prediction unit 120 may collect the prediction blocks belonging to the same prediction unit (PU) to generate a plurality of prediction sub blocks (that is, 521, 522, 536, and the like) to perform the encoding processing on each prediction sub block. In this case, each prediction sub block (521, 522, 536, and the like) may be predicted in parallel, that is, simultaneously, after necessary reference pixels are encoded and decoded.

That is, the reference pixels divided as the reference pixel group are predicted by forming the reference sub blocks together with the reference pixels of the neighbor prediction units (PU) within the same coding unit (CU) or the same sub-coding unit (Sub-CU) and the prediction pixels divided as the prediction pixel group may be predicted by forming the pixels belonging to the same prediction unit (PU) as the prediction sub blocks.

The transform and quantization of the reference pixels and the prediction pixels predicted by the foregoing process are performed in a unit of the reference sub blocks or the prediction sub blocks (that is, 511, 512, 517, 512, 522, 536, and the like) used for the prediction of the foregoing reference pixels and prediction pixels or may be processed in each prediction unit (PU) unit or the sub-coding unit (Sub-CU) or the coding unit (CU) unit.

Meanwhile, the reference pixels are first decoded during the decoding process and component values of the prediction pixels may be predicted from the decoded reference pixels.

Figure 7:
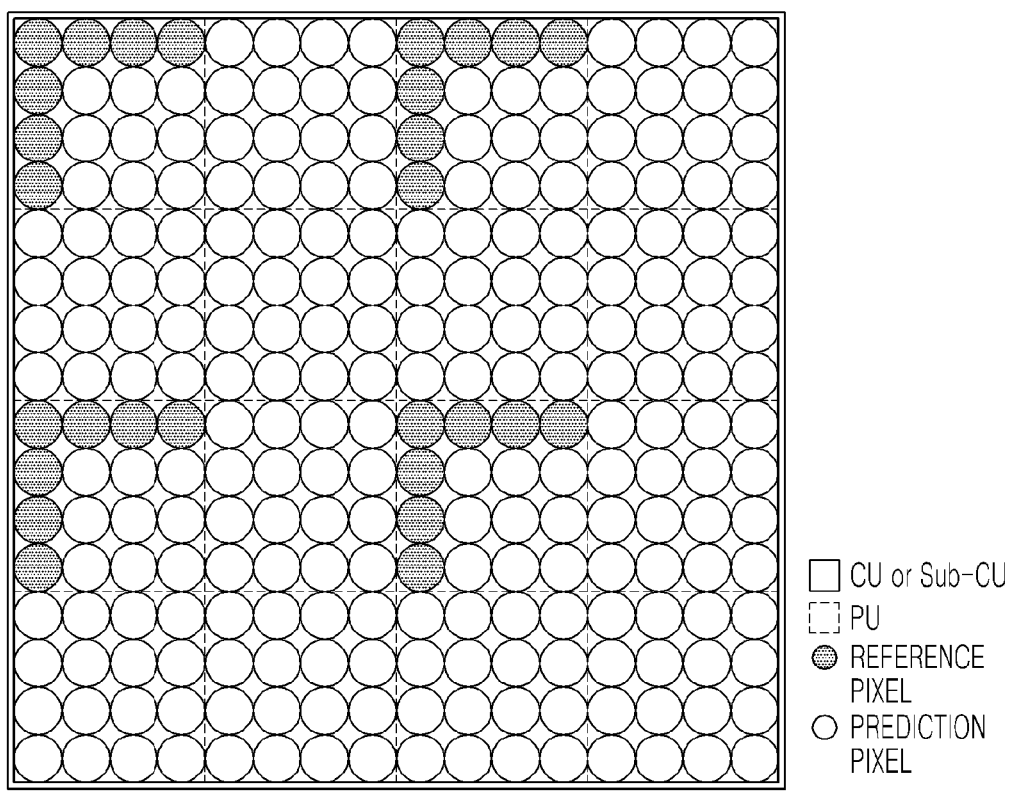
FIG. 7 is a second exemplified diagram of dividing a coding unit into a reference pixel group and a prediction pixel group in the parallel intra prediction method for video data in accordance with the embodiment of the present invention.

FIG. 7 is a second exemplified diagram of dividing a coding unit into a reference pixel group and a prediction pixel group in the parallel intra prediction method for video data in accordance with the embodiment of the present invention.

Meanwhile, the embodiments of the present invention divide the pixels in all the prediction units (PUs) present in the coding unit (CU) or the sub-coding unit (Sub-CU) into the reference pixel group and the prediction pixel group and thus, describe, by way of example, the case of the parallel intra prediction.

However, the technical scope of the present invention is not limited thereto and therefore, the parallel intra prediction may be performed only the pixels within some prediction units (PUs) according to the performance of the encoder.

For example, as illustrated in FIG. 7, only the pixels within the prediction unit (PU) located at the left upper among four prediction units (PU) present within the sub-coding unit (Sub-CU) are divided into the reference pixel group and the prediction pixel group to perform the parallel intra prediction.

As described above, according to the parallel intra prediction method for video data in accordance with the embodiments of the present invention, it is possible to shorten the encoding time for video data by separately encoding the pixels used as the reference pixels and the pixels predicted from the reference pixels in the intra prediction to remove the inter-block data dependency and performing the intra prediction in parallel.

In accordance with the embodiments of the present invention, it is possible to shorten the encoding time for video data in all the devices using the encoder by removing the inter-prediction block data dependency to perform the intra prediction in parallel when the intra prediction is performed during the encoding and decoding process for video data.

Further, it is possible to perform the fine intra prediction in a small block unit on the ultra-high definition image in addition to UHD by largely shortening time required for the intra prediction when the present invention is implemented by hardware having the plurality of intra prediction units or the parallel processing software.

Although the embodiments of the present invention have been described in detail, they are only examples. It will be appreciated by those skilled in the art that various modifications and equivalent other embodiments are possible from the present invention. Accordingly, the actual technical protection scope of the present invention must be determined by the spirit of the appended claims.

What is claimed is:

1. A parallel intra prediction method for encoding video data in a coding unit (CU) or a sub-coding unit (Sub-CU), comprising:
    dividing, by an intra prediction unit, the CU or the Sub-CU into a plurality of prediction units;
    classifying, by an intra prediction unit, each pixel in each of the plurality of prediction units into one of a reference pixel group and a prediction pixel group;
    dividing, by the intra prediction unit, pixels in the reference pixel group into a plurality of reference sub blocks, and pixels in the prediction pixel group into a plurality of prediction sub blocks, each reference sub block having pixels from more than one of the plurality of prediction units;

performing, by the intra prediction unit, encoding processing on the plurality of reference sub blocks; and subsequently performing, by the intra prediction unit, encoding processing on the plurality of prediction sub blocks, using results of the encoding processing on the plurality of reference sub blocks.

2. The parallel intra prediction method of claim 1, wherein the classifying includes classifying only pixels located at a left boundary surface and pixels located at an upper boundary surface of each of the plurality of prediction units into the reference pixel group.

3. The parallel intra prediction method of claim 1, wherein the intra prediction unit uses location information of the pixels in the reference pixel group and that of the pixels in the prediction pixel group to divide the two groups of pixels respectively into the plurality of reference sub blocks and the plurality of prediction sub blocks.

4. The parallel intra prediction method of claim 1, wherein the performing encoding processing on the plurality of reference sub blocks includes using encoding processing results for one of the reference sub blocks previously encoded to perform encoding processing on a subsequent one of the reference sub blocks.

5. The parallel intra prediction method of claim 1, wherein transform and quantization, inverse transform and dequantization processing for the reference pixel group and the prediction pixel group are performed based on any one of a sub block unit, a prediction unit, a Sub-CU, and a CU.

6. The parallel intra prediction method of claim 1, wherein each reference sub block includes a pixel from each of the plurality of prediction units.

* * * * *